United States Patent [19]

Boucherie

[11] 4,306,647
[45] Dec. 22, 1981

[54] DEVICE FOR ORIENTATING WORKPIECES, MORE ESPECIALLY BRUSH BODIES

[75] Inventor: Leonel P. Boucherie, Roeselare-Rumbeke, Belgium

[73] Assignee: Firma G. B. Boucherie, Namloze Vennootschap, Izegem, Belgium

[21] Appl. No.: 142,827

[22] Filed: Apr. 22, 1980

[30] Foreign Application Priority Data

May 31, 1979 [DE] Fed. Rep. of Germany ....... 2922290

[51] Int. Cl.³ .............................................. B65G 47/24
[52] U.S. Cl. .................... 198/379; 198/395; 198/399; 221/158; 221/173; 300/2
[58] Field of Search ............... 198/379, 395, 396, 397, 198/399; 221/156, 158, 171, 173; 300/2, 5, 7

[56] References Cited

U.S. PATENT DOCUMENTS 2,635,662  4/1953  Doering et al. .................. 198/396 X
3,517,795  6/1970  Dixon .................................... 198/395

Primary Examiner—Jeffrey V. Nase
Attorney, Agent, or Firm—Bacon & Thomas

[57] ABSTRACT

The invention pertains to a device for orientating workpieces, more especially brush bodies, of the type that is formed by a feeding box for workpieces; a transport device which conveys the workpieces one by one opposite to a detecting device and an orienter which place all detected workpieces in the same position, in order to finally feed them into a magazine or processing machine. The detecting and orientating devices are formed by a support which is located opposite to a transport device consisting of a drum and fixed to the side wall of the device, to which support, radially movable in relation to the aforesaid transport drum, is fixed a bridge which, on one side of the transport drum and in the path of the workpieces. A stop is provided on the other side of the transport drum, and coaxially with a first stop. The apparatus is provided with an axially movable spindle or second stop, these stops cooperate with the concerned ends of the workpiece in order to fix same between the two aforesaid stops; a device is provided which, during the aforesaid motion of the bridge, detect the position of the workpiece and allow, if necessary, to turn the second stop and the workpiece 180°.

9 Claims, 10 Drawing Figures

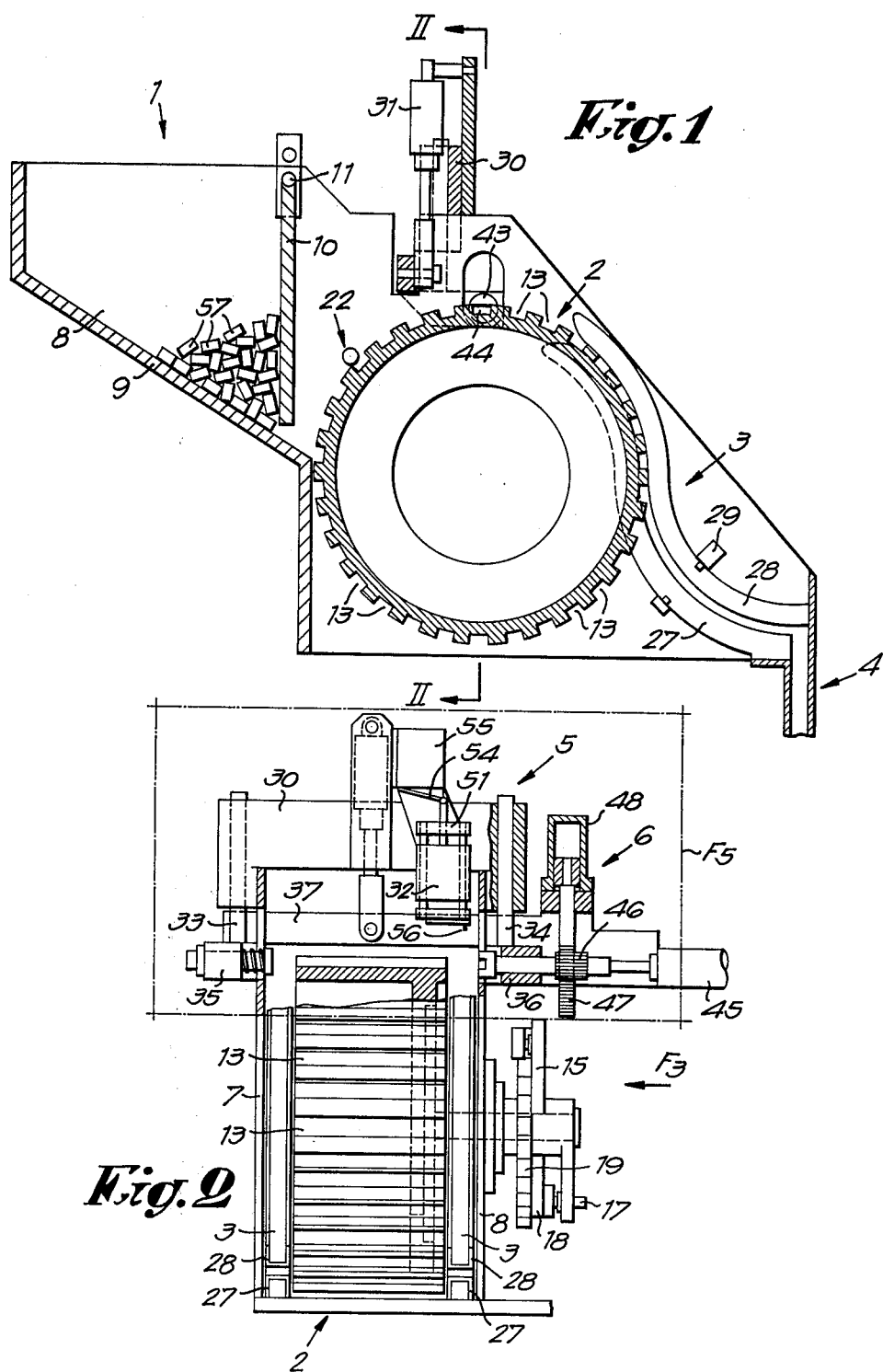

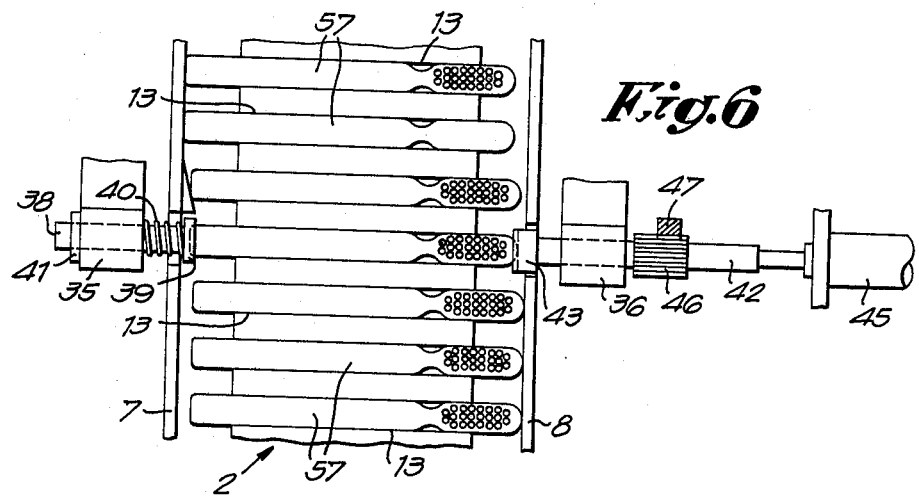
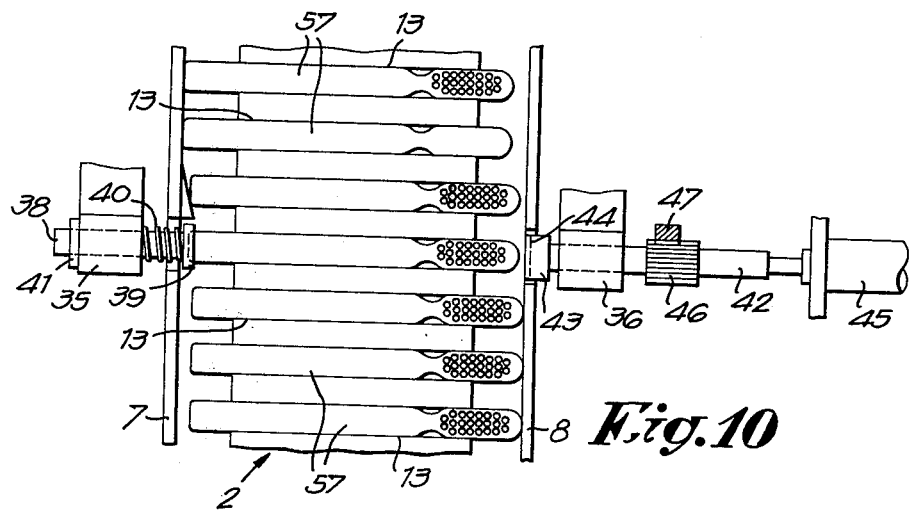

DEVICE FOR ORIENTATING WORKPIECES, MORE ESPECIALLY BRUSH BODIES

BACKGROUND OF THE INVENTION

The present invention relates to a device for orientating workpieces, especially brush bodies, in other words to a device the purpose of which is to correctly orientate workpieces, especially brush bodies, in order to make it possible to feed these workpieces in the correct position into the processing machine proper.

SUMMARY OF THE INVENTION

More especially yet, the present invention relates to a device the purpose of which is to orientate workpieces such as brush bodies, in other words, in the case of brush bodies, to position these workpieces at least with the small holes in one and the same direction and, in the case of brush bodies the holes of which are not symmetrically positioned, for instance in the case of toothbrushes, possibly to turn the brush bodies over longitudinally.

The device according to the invention can be used either separately or in direct combination with the processing machine.

In this way there is obtained that for the operator of the processing machine it is no longer necessary to put the workpieces in the right position into the machine, the continuous presence of the operator is no longer required and he can not only spread his attention on a number of machines at the same time, but also take charge of additional tasks, as for instance controlling or packing the delivered products.

The device according to the invention, which is of the type which comprises a feeding box for workpieces, a transport device which successively conveys the workpieces to a position which is opposite to a detecting device and means which place the detected workpieces in the same orientation, in order to finally feed them into a magazine or processing machine. The detection and orientation devices consist of a support, mounted opposite to a transport device formed by a drum and fixed to the side wall of the device, to which, radially movable in relation to the aforesaid transport drum, a bridge is fixed which, on one side of the transport drum and in the path of the workpieces, is provided with a stop and which, on the other side of the transport drum and co-axially with the first stop, is provided with an axially movable spindle or second stop, whilst the stops can appropriately cooperate with the concerned ends of the workpieces, in order to fix them between the aforesaid stops; means which detect the position of the workpiece during the aforesaid motion of the bridge and means which allow, if necessary, to turn the aforesaid second stop, and the workpiece 180°.

BRIEF DESCRIPTION OF THE DRAWINGS

In order to throw more light on the characteristics of the invention, a preferred embodiment will be described hereinafter, as an example without any limiting character, reference being made to the attached drawings in which:

FIG. 1 is a vertical longitudinal section of a device embodying the invention;

FIG. 2 is a sectional view taken on the line II—II in FIG. 1;

FIG. 6 is a schematic section taken on line VI—VI in FIG. 5, brush bodies being in place;

FIG. 10 is a view similar to the one of FIG. 6, but showing a second characteristic position.

DESCRIPTION OF A PREFERRED EMBODIMENT

Figure 3:
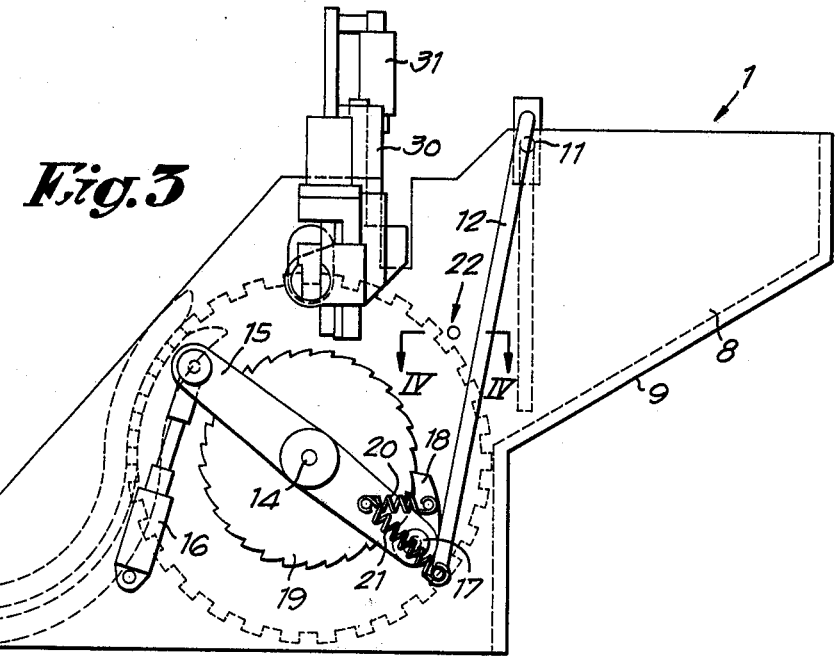
FIG. 3 is a view according to the arrow F3 in FIG. 2.

The device described referring to the attached Figures is intended for correctly orientating toothbrush bodies, in other words for appropriately detecting the side with the ready-made small holes and positioning same in the correct direction. It is clear that a device of the kind can be adapted for any brush body type, but in the present example a flat brush body has been chosen for the sake of simplicity.

The device according to the aforesaid Figures mainly consists of a feeding box 1, wherein the brush bodies are put, in the present case all with the ends in which the small holes are made directed to the same side of the device; a transport drum 2 which successively carries along the brush bodies away from the aforesaid feeding box 1; a guiding device 3 wherein the brush bodies are received and which conveys the brush bodies into an appropriate magazine 4, which may or may not be directly connected with the brush-processing machine; means 5 to detect whether the brush bodies are lying on the transport drum 2 with the small holes up or down and means 6 allowing, if necessary, to turn the brush body so that it becomes positioned with the small holes in the correct position.

Figure 5:
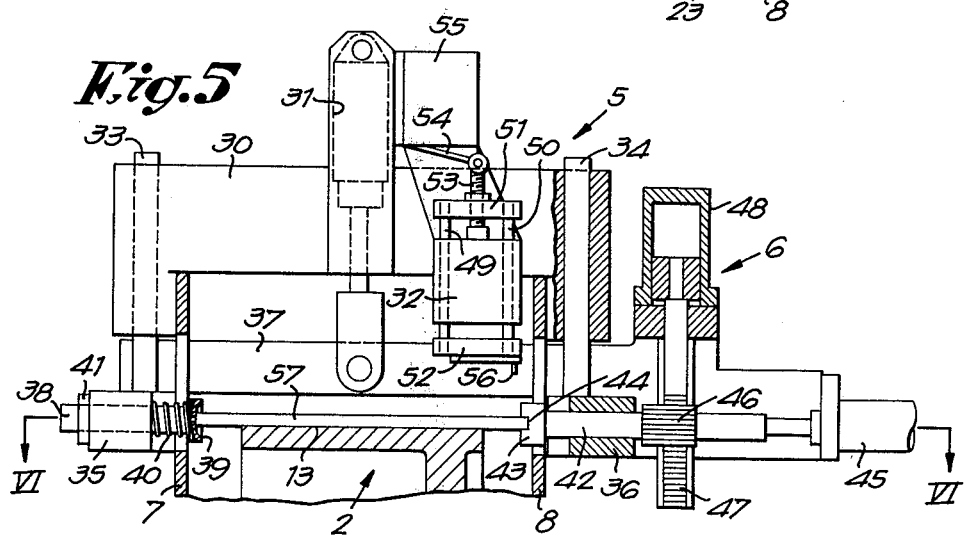
FIG. 5 shows, on an enlarged scale, the part which is indicated by F5 in FIG. 2.

The feeding box 1 is formed by the side walls 7 and 8 of the device together with a bottom 9 sloping down towards the transport drum 2. In this box 1 and in close proximity to the aforesaid transport drum 2, a flap 10 is provided, which extends over the full width of the box 1 and which is pivotably suspended in the box 1 by means of a spindle 11, the aforesaid flap being connected at its upper side with a rod 12 (FIG. 5) which, in an appropriate way, as will appear hereinafter, is moved to and fro in order to transmit to the aforesaid flap 10, during the operation of the device, a continuous oscillating motion, ensuring the supply of brush bodies from the box 1 to the transport drum 2.

The transport drum 2 has on the whole of its circumference longitudinal grooves 13, the width and height of which respectively correspond with the width and thickness of the brush bodies.

In this connection, it should be noted that in the case of profiled brush bodies the aforesaid grooves show a corresponding profile.

The drum 2 is mounted on a shaft 14, on which there is freely rotatably mounted a lever 15, this lever 15 being pivotably connected at one end with the end of the piston rod of a pressure cylinder 16 and this lever 15 being pivotably connected at its other end, by means of a pin 17, with a pawl 18, which is capable of cooperating with a ratchet-wheel 19 fixed on the aforesaid shaft 14 in order, in this way, to drive the drum 2 step by step. The number of teeth of the ratchet-wheel 19 shall preferably correspond with the number of grooves 13 provided for in the transport drum 2.

In order permanently to keep the pawl 18 in contact with the ratchet-wheel 19, a spring 20, for instance, may be provided.

The end of the aforesaid rod 12 rests on the back of the aforesaid pawl 18 and is connected, by means of a spring 21, with the lever 15, so that the rod 12, during the motion of the pawl 18, is moved to and fro by the latter and, in its turn, transmits an oscillating motion to the flap 10.

Figure 4:
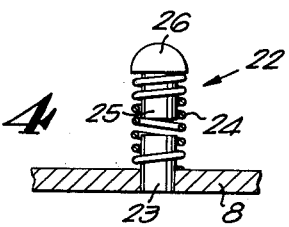
FIG. 4 is a sectional view, on an enlarged scale, taken on the line IV—IV in FIG. 3.

Behind the aforesaid flap 10 and above the transport drum 2, means 22 (see FIG. 4) are provided for in each side wall 7-8 of the device to ensure that brush bodies which are not correctly lying in a groove 13 will be removed from this groove. These means are formed in a simple way by a support 23, which is firmly fixed in the concerned wall of the device, whilst on this support a small spring 24 is fixed, which at its other end is fixed to a body 25, the free end of which is for instance a half-spherical head 26, these means 22 being capable of slightly moving together, whenever there passes a brush body that is located above a groove 13, in order to finally remove this brush body from the drum 2, avoiding any possible damage to the machine and/or brush bodies.

Adjacent to the guiding device 3, which is formed on each side by appropriately profiled strips, respectively 27 and 28, between which the ends of the brush bodies can slide, a detector 29 is provided for which, should the magazine 4 become filled in such a way that brush bodies become located under the detector 29, will stop the operation of the pressure cylinder 16, so that the device will also come to a standstill until the time when brushes will be taken off again.

The device 5 mainaly consists of a support 30, fixed to the aforesaid side walls 7 and 8, to which, on the one hand, is fixed a pressure cylinder 31 and, on the other hand, a guiding device 32.

The support 30 guides two rods, respectively 33 and 34, which are fixed at their underside on projections, respectively 35 and 36, located above the centre line of the transport drum 2, these projections 35 and 36 being connected the one with the other by means of a bridge 37, to which the pressure cylinder 31 is also attached.

In the projection 35, a spindle 38 is provided which is axially movable in this projection, in a parallel direction to the rotation axis of the drum 2, this spindle 38 being provided at the front end with a head or stop 39, acted upon by a spring 40, the other end of which is in contact with the projection 35, the spindle 38 being provided at the other end with a stop 41, which limits the maximum forward motion of the spindle 38 under the influence of the spring 40.

In the other projection 36, an axially movable spindle 42 is also provided, running in a parallel direction to the rotation axis of the drum 2, which shows at the front a head or stop 43, wherein a radial groove 44 is provided for, with which an end of a brush body can cooperate, this spindle being connected at the rear with the piston rod of a pressure cylinder 45 determining the axial motion of the spindle 42. Furthermore, on this spindle 42, there is fixed a pinion 46 cooperating with a rack-bar 47, itself acted upon by a pressure cylinder 48. The length of the pinion 46 is such that the cooperation between this pinion and the rack-bar 47, is always ensured, whichever may be the axial position of the spindle 42.

In the support 32, two passages are furthermore provided for, to act as guides for rods, respectively 49 and 50, these rods, outside of the component 32, being connected by means of transverse parts, respectively 51 and 52, the first of which is provided with an adjustable stop 53, the end of which can cooperate with the switching lever 54 of a switch 55, whilst the second transverse part 52 is provided with at least one small pin 56, directed downwards, the diameter of which is a little smaller than the diameter of the small holes in the brush body.

The operation of the deivce described hereinabove is very simple.

It is sufficient, indeed, to put into the feeding box 1 a certain quantity of brush bodies 57, all these brush bodies, in the case of unsymmetrical brushes, as for instance tooth-brushes, being placed in the same direction.

By means of the to and fro motion of the flap 10, there is achieved that the brush bodies are released approximately one by one into the space existing between the flap 10 and transport drum 2, where the brush bodies are conveyed one by one by the grooves 13 in an ascending motion, the means 22 achieving that brush bodies which are not correctly placed in their groove 13 are pushed away and fall back.

When a brush body is placed between the head 39 of the spindle 38 and head 43 of the spindle 42, see especially FIG. 10, the pressure cylinder 45 is influenced in such a way that the head 43 comes into contact with the brush body 57, the groove 44 placing itself upon the corresponding end of the brush body and making the brush body slide against the action of the spring 40, until a determined position is reached, see amongst others FIG. 6.

After this, one will actuate the pressure cylinder 31 in order to obtain that this brush body, via the bridge 37, the guiding devices 33 and 34 and projections 35 and 36, be moved upwards and against the detector pin 56.

Figure 7:
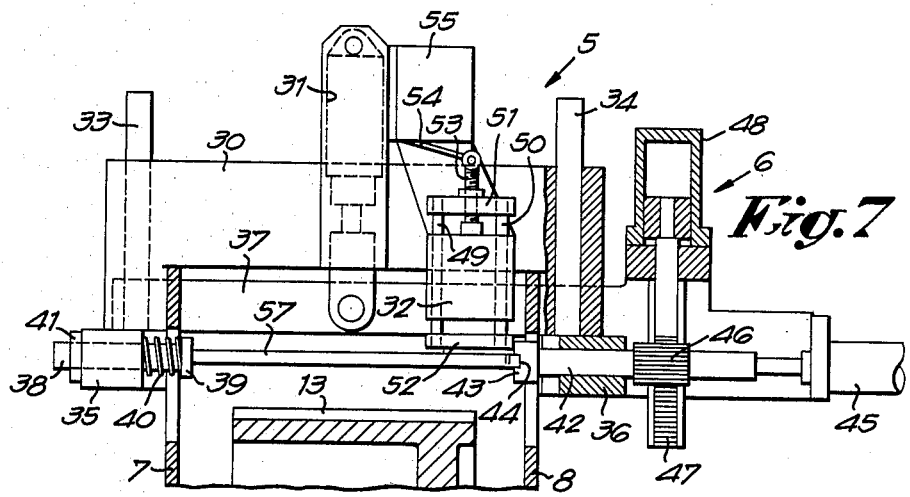
FIGS. 7 through 9 are views similar to FIG. 5, but showing other characteristic positions of the device.
Figure 8:
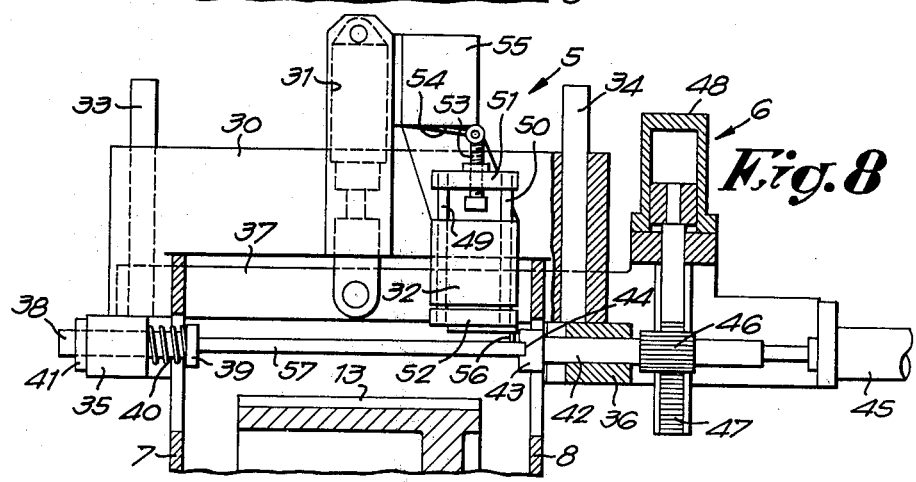
Figure 9:
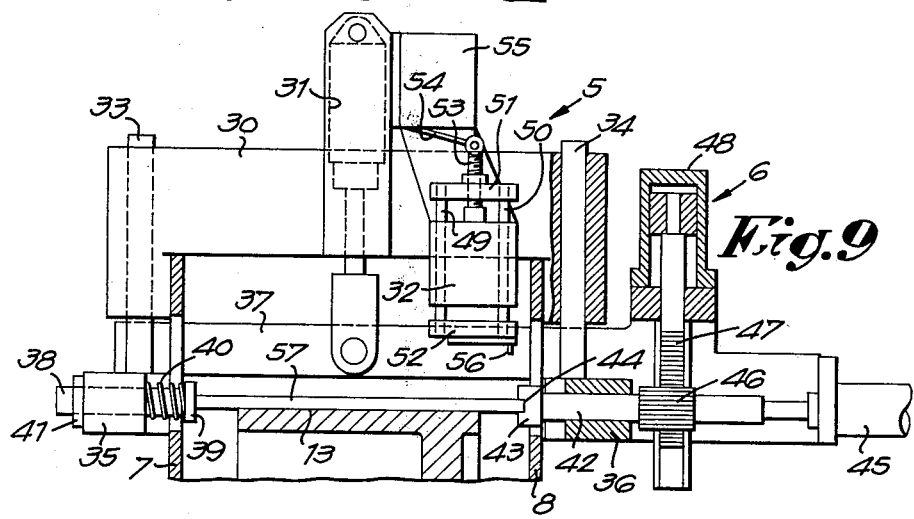

If the small holes in the brush body are directed upwards at this moment, one obtains, as shown in FIG. 7, that the pin 56 simply penetrates into a small hole of the brush body 57, whereby the switch is not influenced and the pressure cylinder 31 simply pushes down the bridge 37, together with the brush body 57 which, when it is transferred back into the concerned groove 13 of the transport drum 2, becomes liberated by the backward motion of the spindle 42, and after this the drum is moved one step by the motion of the lever 15.

If, on the contrary, when the brush body 57 moves upwards, the pin 56 comes into contact with the upper face of the brush body because of the small holes of the brush body being located at the underside, the pin 56, together with the rods 49, 50, the transverse parts 51, 52, and stop 53, will be moved upwards so as to influence the switch 55. At this moment, the pressure cylinder 48 receives a command which is such that, during the subsequent downward motion of the bridge 37, the pinion 46, and thus the spindle 42, is turned 180°, resulting in the brush body also being turned and, with the small holes directed upwards, being placed in the drum 2, which subsequently is appropriately driven.

It is clear that in this way there is achieved that all brush bodies are placed with the small holes upside in the transport drum 2, in such a way that the brush bodies are introduced in this position into the guiding device 3 and subsequently into the magazine 4, in order so to be fed to the brush processing machine.

It is also clear that the brush bodies can be manually placed in the feeding box 1 or that these brush bodies may be fed to the feeding box 1 from another device. This other device may for instance consist of means allowing to detect the brush bodies, supposing they are unsymmetrical bodies and are put without a fixed orientation into a feeding box, and possibly to turn same, in order to place the brush bodies with the small holes in one and the same direction, and further allowing to feed them to the device according to the present invention.

Such an auxiliary device may either be individually provided for or be directly connected with the device according to the invention.

It is clear that the present invention is by no means limited to the device as described hereinabove and illustrated in the attached drawings, but that such a device can be made in various shapes and with various dimensions, and be adapted for all possible pieces of work without going outside the scope of the invention.

What I claim is:

1. A device for orienting workpieces such as brush bodies, comprising:

a feed box for workpieces;

a transport drum arranged to receive workpieces from said feed box and convey them past orientation detecting and orienting devices, said orienting device comprising a support and a bridge movable thereon in a direction radial to said drum, said bridge having a first stop member at one end of said drum and a second stop member at the other end of said drum, said second stop member being on an axially movable and rotatable spindle whereby said stops may engage opposite ends of a workpiece on said drum, lift the same radially from said drum to permit rotation of said spindle and workpiece when necessary to reorient the same.

2. A device as defined in claim 1 wherein said support is provided with guide passages and rods slidable in said passages, said bridge being carried by said rods, and a first pressure cylinder on said support and connected to said bridge.

3. A device as defined in claim 1 wherein said first stop member is mounted on a further spindle which is axially slidable on said bridge, said first stop being a head on said spindle configured to engage an end of a workpiece, spring means urging said further spindle and head toward said second stop member, and limiting means for limiting the movement of said further spindle toward said second stop member.

4. A device as defined in claim 1 wherein an end of said spindle defines said second stop member, and the piston rod of a second pressure cylinder being connected to the other end of said spindle for moving the same axially of said drum.

5. A device as defined in claim 1 or 4 wherein said second stop member is provided with a radial groove, configured to receive an end of a workpiece.

6. A device as defined in claim 1 wherein said orientation detecting device comprises means defining a pin directed radially toward said drum and movable in that radial direction, and a switch responsive to radially outward movement of said pin for initiating rotation of said spindle.

7. A device as defined in claim 6 wherein said pin is carried by a part slidable radially guided on said support for movement radially of said drum, said slidable part having an adjustable portion for actuating said switch.

8. A device as defined in claim 1 including a pinion on said spindle, a rack bar meshing with said pinion and a third pressure cylinder having a piston rod connected to said rack bar for oscillating the same and thereby rotating said spindle.

9. A device as defined in claim 8 wherein the axial length of said pinion is such as to remain in mesh with said rack bar irrespective of axial movements of said spindle.

* * * * *